US010052931B2

(12) United States Patent
Nakashima et al.

(10) Patent No.: US 10,052,931 B2
(45) Date of Patent: Aug. 21, 2018

(54) OUTDOOR COOLING UNIT IN VEHICLE AIR-CONDITIONING APPARATUS

(71) Applicants: Seiji Nakashima, Tokyo (JP); Shinichi Wakamoto, Tokyo (JP); Taichi Uto, Tokyo (JP)

(72) Inventors: Seiji Nakashima, Tokyo (JP); Shinichi Wakamoto, Tokyo (JP); Taichi Uto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 133 days.

(21) Appl. No.: 14/349,467

(22) PCT Filed: Oct. 5, 2012

(86) PCT No.: PCT/JP2012/076014
§ 371 (c)(1),
(2) Date: Apr. 3, 2014

(87) PCT Pub. No.: WO2013/069397
PCT Pub. Date: May 16, 2013

(65) Prior Publication Data
US 2014/0246180 A1    Sep. 4, 2014

(30) Foreign Application Priority Data
Nov. 10, 2011  (JP) ................. 2011-246712

(51) Int. Cl.
*B60H 1/00* (2006.01)
*F04D 25/16* (2006.01)
(Continued)

(52) U.S. Cl.
CPC ....... *B60H 1/00321* (2013.01); *F04D 25/166* (2013.01); *F04D 29/384* (2013.01);
(Continued)

(58) Field of Classification Search
CPC .... F04D 25/166; F04D 29/384; F04D 29/522; F04D 29/541; F04D 29/545; B60H 1/00321
(Continued)

(56) References Cited

U.S. PATENT DOCUMENTS 4,569,631 A * 2/1986 Gray, III ............... F04D 29/386
                                                416/169 A
4,886,415 A * 12/1989 Engelberger .......... F04D 29/526
                                                415/119
(Continued)

FOREIGN PATENT DOCUMENTS

JP         5-202893        8/1993
JP       2003-042098        2/2003
(Continued)

OTHER PUBLICATIONS

U.S. Appl. No. 14/765,501, filed Aug. 3, 2015, Nakashima, et al.
(Continued)

*Primary Examiner* — Raheena R Malik
(74) *Attorney, Agent, or Firm* — Oblon, McClelland, Maier & Neustadt, L.L.P.

(57) ABSTRACT

An outdoor cooling unit in a vehicle air-conditioning apparatus is configured such that the angle between a normal line to a suction plane of a suction portion and a normal line to a discharge plane of a discharge portion is acute and such that air inside a housing flows in a substantially checkmark-shape, substantially V shape or substantially U shape. In the outdoor cooling unit, a blade of an axial fan is configured such that a chord center line formed by connecting chord central points from an inner circumferential end to an outer circumferential end of the blade and projecting the connected chord central points on a plane containing a rotating
(Continued)

shaft is convexly curved toward the downstream side over the entire area in the radial direction.

4 Claims, 5 Drawing Sheets

(51) Int. Cl.
    *F04D 29/38*     (2006.01)
    *F04D 29/54*     (2006.01)
    *F04D 29/52*     (2006.01)

(52) U.S. Cl.
    CPC ......... *F04D 29/522* (2013.01); *F04D 29/541* (2013.01); *F04D 29/545* (2013.01)

(58) Field of Classification Search
    USPC .................................................. 165/121, 120
    See application file for complete search history.

(56) References Cited

U.S. PATENT DOCUMENTS

| | | | | |
|---|---|---|---|---|
| 5,343,831 | A * | 9/1994 | Collins | F01P 5/06 123/198 E |
| 5,393,199 | A * | 2/1995 | Alizadeh | F04D 29/384 416/169 A |
| 6,428,277 | B1 * | 8/2002 | Holmes | F04D 29/326 416/189 |
| 6,447,251 | B1 * | 9/2002 | Zeng | F04D 29/384 416/210 R |
| 6,544,010 | B1 * | 4/2003 | Choi | F04D 19/002 416/223 R |
| 6,558,123 | B1 * | 5/2003 | Spaggiari | F04D 29/384 415/119 |
| 8,491,270 | B2 * | 7/2013 | Eguchi | F04D 29/384 416/235 |
| 2007/0122287 | A1 * | 5/2007 | Pennington | F04D 29/384 416/223 R |
| 2007/0125525 | A1 * | 6/2007 | Heine | F28F 9/002 165/121 |
| 2008/0213103 | A1 * | 9/2008 | Miyakoda | F04D 29/384 417/354 |
| 2012/0018117 | A1 * | 1/2012 | Yamada | F24F 1/0007 165/11.1 |
| 2012/0211205 | A1 * | 8/2012 | Eguchi | F04D 29/4226 165/121 |
| 2013/0045107 | A1 * | 2/2013 | Topaz | B63H 1/26 416/243 |
| 2013/0101420 | A1 * | 4/2013 | Nakashima | F04D 29/384 416/204 R |

FOREIGN PATENT DOCUMENTS

| | | |
|---|---|---|
| JP | 2003-48536 A | 2/2003 |
| JP | 2003048536 A * | 2/2003 |
| JP | 2005-016357 | 1/2005 |
| JP | 2011-085106 | 4/2011 |

OTHER PUBLICATIONS

Chinese Office Action dated Jan. 4, 2016 in Patent Application No. 201280055038.8 (with English Translation).

Combined Office Action and Search Report dated Aug. 20, 2015 in Chinese Patent Application No. 201280055038.8 (with English language translation and English translation of categories of cited documents).

Extended European Search Report dated Jul. 28, 2015 in Patent Application No. 12848072.0.

International Search Report dated Dec. 25, 2012 in PCT/JP12/76014 filed Oct. 5, 2012.

Office Action dated Jul. 15, 2016 in Chinese Patent Application No. 201280055038.8 (with English language translation).

Office Action dated Jun. 28, 2017 in European Patent Application No. 12848072.0.

Office Action dated Apr. 24, 2018 in corresponding Indian Patent Application No. 3317/CHENP/2014 with English Translation.

* cited by examiner

AIRFLOW

AIRFLOW

OUTDOOR COOLING UNIT IN VEHICLE AIR-CONDITIONING APPARATUS

TECHNICAL FIELD

The present invention relates to an outdoor cooling unit in a vehicle air-conditioning apparatus mounted on a vehicle, such as a train car.

BACKGROUND ART

An example of known techniques of reducing noise of an outdoor cooling unit in a vehicle air-conditioning apparatus is proposed as a vehicle heat-exchange module "in which a fan unit is provided at the downstream side of a rectangular heat exchanger, and the fan unit is provided with a shroud having a bell-mouth and an annular opening, a propeller fan that is disposed in the annular opening, and a fan motor that rotationally drives the propeller fan, the fan unit is a unit having a single-fan configuration in which motor input power is at a predetermined level or less, and the propeller fan is provided with two sets of winglets that are respectively constructed upright, with a prescribed gap therebetween in the radial direction, along the circumferential direction on both a pressure surface and a suction surface of the root side of the blades" (see, for example, Patent Literature 1).

The vehicle heat-exchange module in Patent Literature 1, which has the above-described configuration, is described as being capable of suppressing separation of airflow and a turbulent flow caused by a separated air flow moved in the radial direction by the centrifugal force and preventing a deterioration of the aerodynamic performance and an increase in noise.

CITATION LIST

Patent Literature

Patent Literature 1: Japanese Unexamined Patent Application Publication No. 2011-85106 (page 11, FIG. 2)

SUMMARY OF INVENTION

Technical Problem

There exists an outdoor cooling unit in a vehicle air-conditioning apparatus including a housing, an axial fan, a casing, a motor, and a heat exchanger, the housing including a base, a suction portion, and a discharge portion, the axial fan arranged directly below the suction portion, the casing surrounding the axial fan, the motor supporting the axial fan, the heat exchanger arranged adjacent to the discharge portion. In the outdoor cooling unit, the angle between a normal line to a suction plane of the suction portion and a normal line to a discharge plane of the discharge portion is acute, and air inside the housing flows in a substantially checkmark-shape, substantially V shape or substantially U shape.

In such an outdoor cooling unit in a vehicle air-conditioning apparatus, a dead air region is present on an inner circumferential side downstream of the axial fan because air does not sufficiently flow into that region, whereas air on an outward side downstream of the axial fan does not smoothly flow in an outward direction (see FIG. 11). This raises a problem in that a turbulent flow is increased and noise is increased.

The vehicle heat-exchange module illustrated in Patent Literature 1 can provide an advantageous effect of suppressing a turbulent flow of an axial fan. However, Patent Literature 1 does not describe any advantageous effect of suppressing a dead air region and an increase in the turbulent flow described above. More sufficient noise reduction than other known techniques is yet to be achieved by the illustrated vehicle heat-exchange module.

The present invention is made to solve the above-described problem. It is an object thereof to provide an outdoor cooling unit in a vehicle air-conditioning apparatus, the outdoor cooling unit being capable of reducing noise more sufficiently compared to known techniques.

Solution to Problem

An outdoor cooling unit in a vehicle air-conditioning apparatus according to the present invention includes a housing, an axial fan, a casing, a motor, and a heat exchanger. The housing includes a suction portion and a discharge portion. The axial fan includes a boss rotatable about a shaft center and a plurality of blades arranged on an outer circumferential portion of the boss and is arranged directly below the suction portion, the suction portion being an opening in a part of a top of the housing. The casing surrounds the axial fan. The motor supports the axial fan and is configured to rotate the axial fan. The heat exchanger is arranged adjacent to the discharge portion in the housing. The outdoor cooling unit is configured such that an angle between a normal line to a suction plane of the suction portion and a normal line to a discharge plane of the discharge portion is acute and such that air inside the housing flows in a substantially checkmark-shape, substantially V shape or substantially U shape. Each of the blades is configured such that a chord center line is convexly curved toward a downstream side of airflow over an entire area in a radial direction, the chord center line being formed by connecting chord central points from an inner circumferential end to an outer circumferential end of the blade and projecting the connected chord central points on a plane containing a rotating shaft.

Advantageous Effects of Invention

In accordance with the outdoor cooling unit in the vehicle air-conditioning apparatus according to the present invention, because the blade is configured the chord center line of the blade in the axial fan is convexly curved toward the downstream side in the entire area in the radial direction, flows of air in the downstream of the axial fan can easily spread in its inner circumferential direction and in its outer circumferential direction, a dead air region on the inner circumferential side can be suppressed, and flows of air on the outer circumferential side can be smoothly directed to the outer circumferential direction. Accordingly, a turbulent flow can be suppressed, and noise can be reduced.

DESCRIPTION OF EMBODIMENTS

Figure 1:
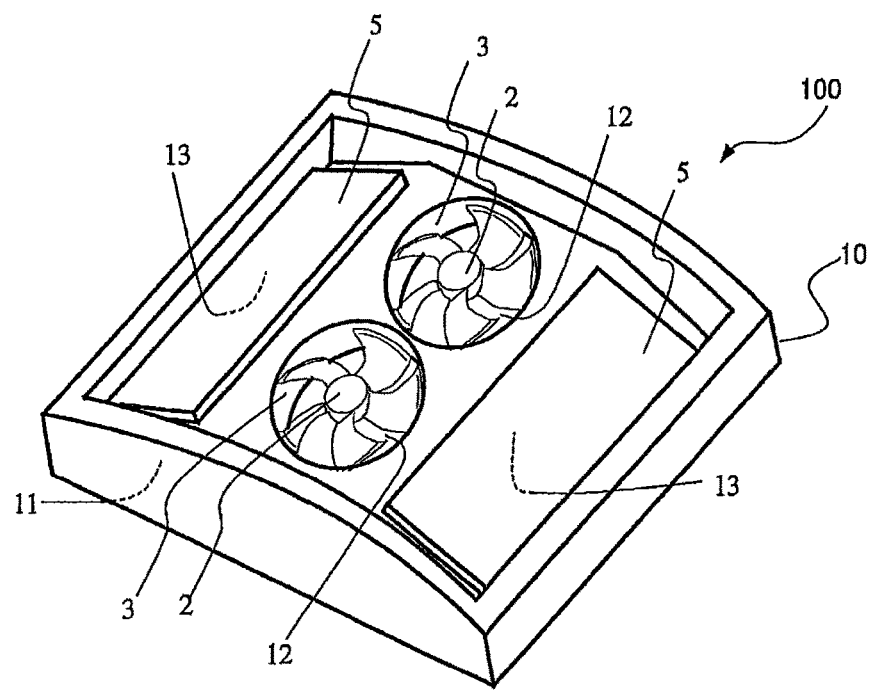
FIG. 1 is a perspective view that illustrates a schematic configuration of an outdoor cooling unit in a vehicle air-conditioning apparatus according to Embodiment 1 of the present invention.

Embodiments of the present invention will be described below with reference to the drawings. In FIGS. 1 to 10, like reference numerals refer to the same or corresponding elements. The same applies throughout the text of the present specification. In the drawings, relations between the sizes of elements may be different from actual ones. In addition, the forms of elements in the full text of the present specification are merely illustrative and are not limited to the description. For example, an example in which the number of axial fans is two and the number of blades is five is illustrated in Embodiments of the present invention. However, the number of axial fans and the number of blades are not restricted.

Embodiment 1

Figure 2:
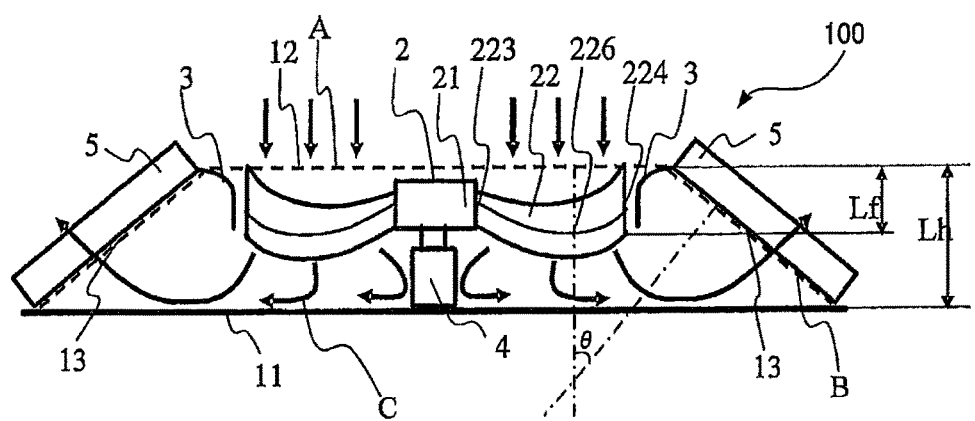
FIG. 2 is a schematic cross-sectional view that illustrates a schematic cross-sectional configuration of the outdoor cooling unit in the vehicle air-conditioning apparatus according to Embodiment 1 of the present invention.
Figure 3:
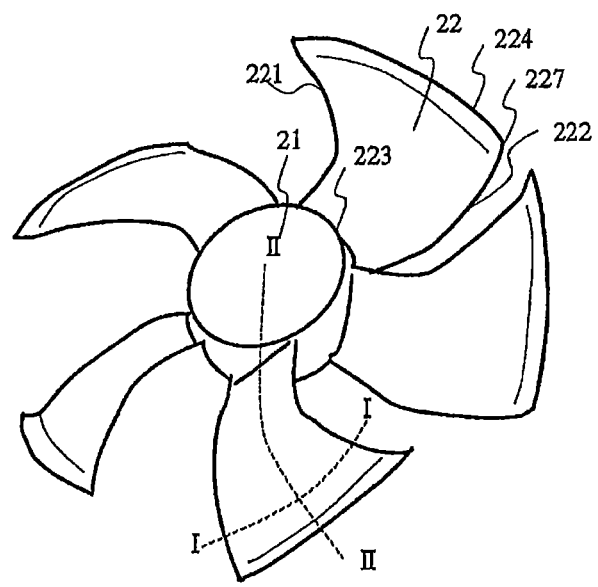
FIG. 3 is a perspective view that illustrates a schematic configuration of an axial fan 2 in the outdoor cooling unit in the vehicle air-conditioning apparatus according to Embodiment 1 of the present invention.
Figure 4:
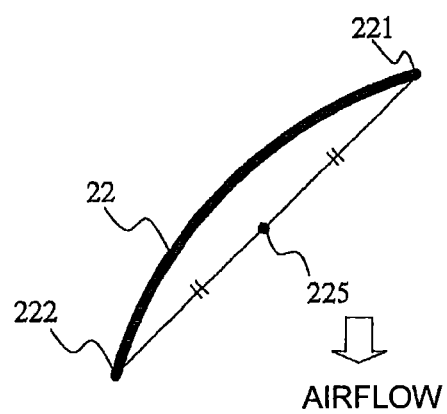
FIG. 4 is a development that illustrates a state where the axial fan is developed to a plane of a cylindrical cross section whose center is in the rotating shaft in the outdoor cooling unit in the vehicle air-conditioning apparatus according to Embodiment 1 of the present invention.
Figure 5:
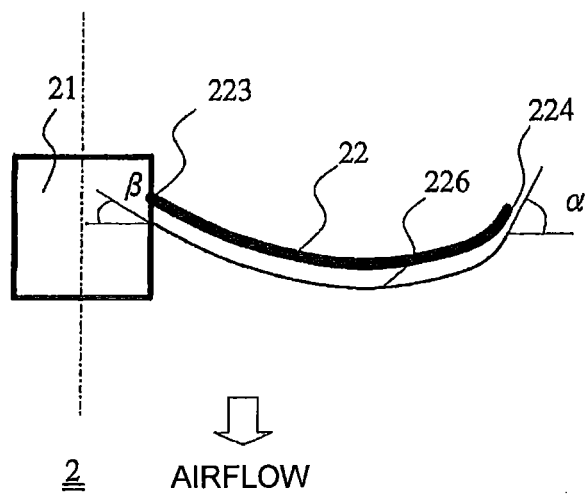
FIG. 5 is a schematic cross-sectional view that illustrates a cross-sectional configuration of the axial fan in the radial direction in the outdoor cooling unit in the vehicle air-conditioning apparatus according to Embodiment 1 of the present invention.

FIG. 1 is a perspective view that illustrates a schematic configuration of an outdoor cooling unit 100 in a vehicle air-conditioning apparatus according to Embodiment 1 of the present invention. FIG. 2 is a schematic cross-sectional view that illustrates a schematic cross-sectional configuration of the outdoor cooling unit 100. FIG. 3 is a perspective view that illustrates a schematic configuration of an axial fan 2 in the outdoor cooling unit 100. FIG. 4 is a development that illustrates a state where the axial fan is developed to a plane of a cylindrical cross section whose center is in the rotating shaft (e.g., cross section I-I in FIG. 3). FIG. 5 is a schematic cross-sectional view that illustrates a cross-sectional configuration of the axial fan 2 in the radial direction (e.g., cross section II-II in FIG. 3). The outdoor cooling unit 100 will be described with reference to FIGS. 1 to 5.

As illustrated in FIGS. 1 and 2, the outdoor cooling unit 100 is mounted on a vehicle, such as a train car, and includes a housing 10, axial fans 2, casings 3, motors 4, and heat exchangers 5.

The housing 10 includes a base 11, suction portions 12, and discharge portions 13. The base 11 defines the outer shape of the outdoor cooling unit 100 and includes a bottom (surface where the motors 4 are disposed) and sides. The top of the base 11 is opened. Opening sections partitioned by the casings 3 and located above the axial fans 2 serve as the suction portions 12 acting as air inlets. Opening sections partitioned by the casings 3 and located above the heat exchangers 5 function as the discharge portions 13 acting as air outlets.

The axial fans 2 are arranged directly below the respective suction portion 12, take air into the housing 10 through the respective suction portions 12, and blow air from inside the housing 10 through the discharge portions 13. The casings 3 are disposed on the housing 10 so as to surround at least the respective axial fans 2 and define the suction portions 12 and the discharge portions 13 in the housing 10. The motors 4 support the respective axial fans 2 and are configured to drive the respective axial fans 2. The heat exchangers 5 exchange heat between a refrigerant passing through a refrigerant pipe (not illustrated) and air supplied from the axial fans 2.

As illustrated in FIG. 2, in the outdoor cooling unit 100, a normal line to a suction plane of the suction portion 12 (plane A illustrated in FIG. 2) and a normal line to a discharge plane of the discharge portion 13 (plane B illustrated in FIG. 2) form an acute angle (angle θ illustrated in FIG. 2). Thus air inside the housing 10 in the outdoor cooling unit 100 flows in a substantially checkmark-shape, substantially V shape or substantially U shape (arrows C inside the housing 10 illustrated in FIG. 2). In FIG. 2, flows of air are represented by arrows. Lf and Lh illustrated in FIG. 2 are used in Embodiment 3. The suction plane A and the discharge plane B are imaginary planes.

As illustrated in FIG. 2, the axial fan 2 includes a boss 21 rotatable about a shaft center and a plurality of blades 22 on the outer circumferential portion of the boss 21. That is, the plurality of three-dimensional blades 22 are radially disposed on the outer circumferential portion of the cylindrical boss 21 rotatable by the motor 4 in the axial fan 2. The rotation of the blades 22 produces an airflow.

As illustrated in FIG. 3, each of the blades 22 is surrounded by a leading edge 221, a trailing edge 222, an inner circumferential end 223, and an outer circumferential end 224. That is, the outer edges of the blade 22 are defined by the leading edge 221 being the edge on the front end side in the rotating direction, the trailing edge 222 being the edge on the rear end side in the rotating direction, the inner circumferential end 223 being the end adjacent to the rotating shaft (not illustrated), and the outer circumferential end 224 being the end distant from the rotating shaft. In FIG. 3, the trailing edge end section of the outer circumferential end 224 in the blade 22 is illustrated as a blade outer trailing edge end section 227. The blade outer trailing edge end section 227 is used in Embodiment 4.

As illustrated in the development in FIG. 4, where the axial fan 2 is developed to a plane of a cylindrical cross section whose center is in the rotating shaft, the midpoint of the line connecting the leading edge 221 and the trailing edge 222 is a chord central point 225. As illustrated in FIG. 5, the curve formed by connecting the chord central points 225 from the inner circumferential end 223 to the outer circumferential end 224 and projecting the connected chord central points on a plane containing the rotating shaft is a chord center line 226. The blade 22 in the axial fan 2 is configured such that the chord center line 226 is convexly curved toward the downstream side of airflow over the entire area in the radial direction. Signs α and β in FIG. 5 are used in Embodiment 2.

With the above-described configuration, flows of air in the downstream of the axial fan 2 in the outdoor cooling unit 100 easily spread in its inner circumferential direction and in its outer circumferential direction. Easily spreading of flows of air in the inner circumferential direction enables the outdoor cooling unit 100 to be able to suppress a dead air region produced by insufficient air, more strongly compared to known outdoor cooling units in vehicle air-conditioning apparatuses in which flows of air are not directed to the inner circumferential direction. Easily spreading of flows of air in the outer circumferential direction causes the flows of air on the outer circumferential side in the outdoor cooling unit 100 to be smoothly directed to the outer circumferential direction and makes the flows of air less susceptible to air passage resistance. Accordingly, the outdoor cooling unit 100 can suppress a turbulent flow and can further reduce noise compared to known units.

Embodiment 2

Figure 6:
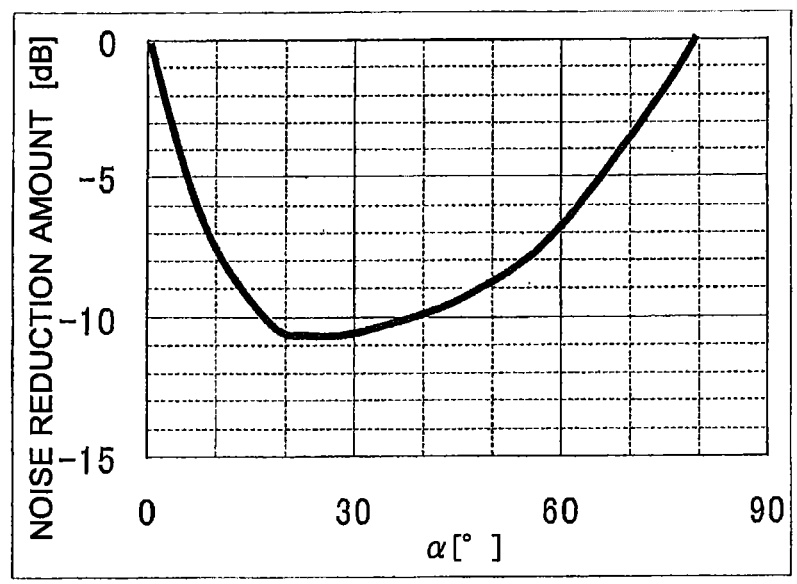
FIG. 6 illustrates the relationship between a noise reduction amount and an angle α between a tangent line to a chord center line of an axial fan at an outer circumferential end and a plane perpendicular to a rotating shaft in an outdoor cooling unit in a vehicle air-conditioning apparatus according to Embodiment 2 of the present invention.
Figure 7:
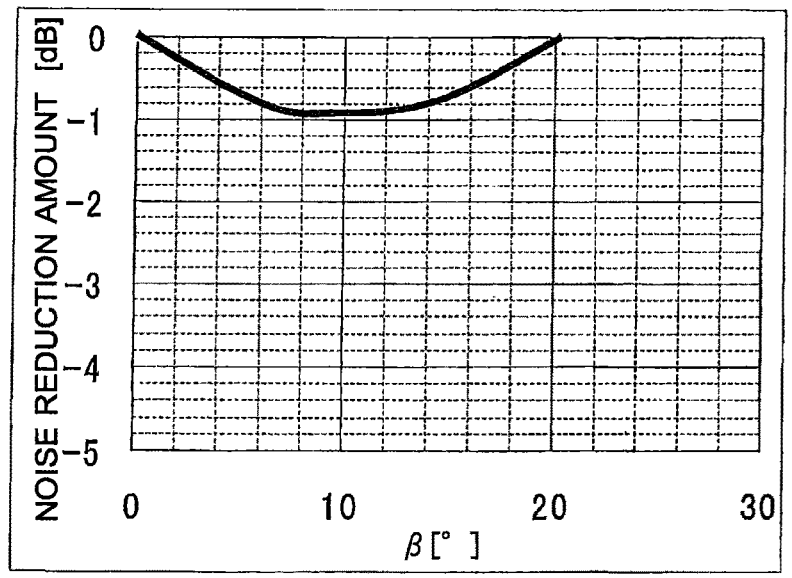
FIG. 7 illustrates the relationship between a noise reduction amount and an angle β between a tangent line to the chord center line at an inner circumferential end in the axial fan and a plane perpendicular to the rotating shaft in the outdoor cooling unit in the vehicle air-conditioning apparatus according to Embodiment 2 of the present invention.

FIG. 6 illustrates the relationship between a noise reduction amount and an angle α between a tangent line to a chord center line at an outer circumferential end of an axial fan and a plane perpendicular to a rotating shaft in an outdoor cooling unit n a vehicle air-conditioning apparatus according to Embodiment 2 of the present invention. FIG. 7 illustrates the relationship between a noise reduction amount and an angle β between a tangent line to the chord center line at an inner circumferential end in the axial fan and a plane perpendicular to the rotating shaft in the outdoor cooling unit in the vehicle air-conditioning apparatus according to Embodiment 2 of the present invention. The outdoor cooling unit in the vehicle air-conditioning apparatus according to Embodiment 2 of the present invention will be described with reference to FIGS. 5 to 7. The basic configuration of the outdoor cooling unit of Embodiment 2 is substantially the same as the configuration of the outdoor cooling unit 100 according to Embodiment 1 (configuration illustrated in FIG. 2).

The outdoor cooling unit according to Embodiment 2 is mounted on a vehicle, such as a train car, and is an example of a configuration for further reducing noise. Here, as illustrated in FIG. 5, the angle between the tangent line to the chord center line 226 at the outer circumferential end 224 in the axial fan 2 and the plane perpendicular to the rotating shaft is defined as α, the angle between the tangent line at the inner circumferential end 223 and the plane perpendicular to the rotating shaft is defined as β, and an angle formed when the chord center line 226 is convexly curved toward the downstream side of airflow is defined as positive. In this construction, the blade 22 of the axial fan 2 in the outdoor cooling unit is configured so as to satisfy at least one of 0°<α<80° and 0°<β<20°. The reason for this will be described below.

The relationship between the angle α and the noise reduction amount will be described using FIG. 6. The noise reduction amount in the present specification indicates the amount of reduction in a noise value for the outdoor cooling unit from a noise value for a known outdoor cooling unit in a vehicle air-conditioning apparatus. FIG. 6 is a graph when β is fixed at 0°. FIG. 6 reveals that in the range of 0°<α<80°, an advantageous effect of reducing noise is obtained.

The relationship between the angle β and the noise reduction amount will be described with reference to FIG. 7. FIG. 7 is a graph when α is fixed at 0°. FIG. 7 reveals that in the range of 0°<β<20°, an advantageous effect of reducing noise is obtained.

With the above-described configuration, flows of air in the downstream of the axial fan 2 in the outdoor cooling unit spread in its inner circumferential direction and in its outer circumferential direction at optimal angles. Spreading of flows of air in the downstream of the axial fan 2 in the inner circumferential direction at an optimal angle does not cause a collision of air with the motor 4. The dead air region on the inner circumferential side can be efficiently suppressed. Spreading of flows of air in the downstream of the axial fan 2 in the outer circumferential direction at an optimal angle enables the flows of air on the outer circumferential side in the outdoor cooling unit to be more smoothly directed to the outer circumferential direction. Accordingly, the outdoor cooling unit can effectively suppress a turbulent flow and can father reduce noise.

Embodiment 3

Figure 8:
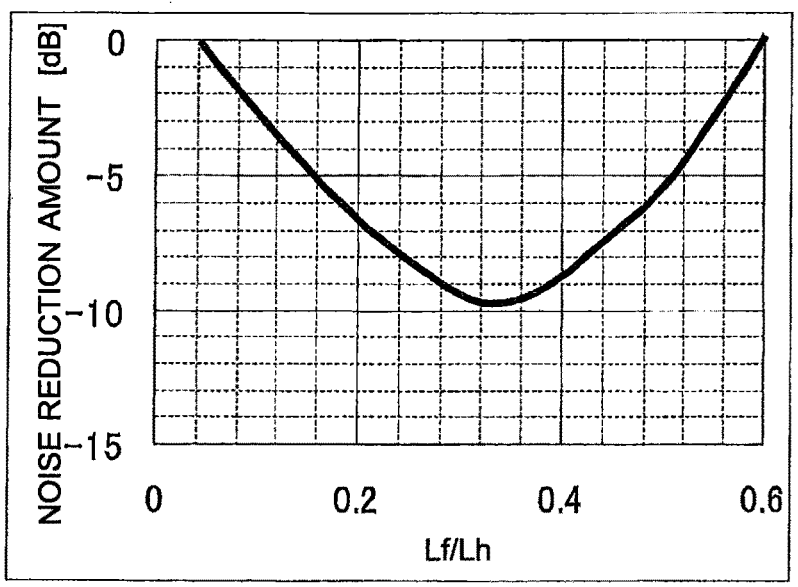
FIG. 8 illustrates the relationship between Lf/Lh and a noise reduction amount in an outdoor cooling unit in a vehicle air-conditioning apparatus according to Embodiment 3 of the present invention.

FIG. 8 illustrates the relationship between Lf/Lh and a noise reduction amount in an outdoor cooling unit in a vehicle air-conditioning apparatus according to Embodiment 3 of the present invention. The outdoor cooling unit in the vehicle air-conditioning apparatus according to Embodiment 3 of the present invention will be described with reference to FIGS. 2 and 8. The basic configuration of the outdoor cooling unit in the present embodiment is substantially the same as the configuration of the outdoor cooling unit 100 according to Embodiment 1 (configuration illustrated in FIG. 2).

The outdoor cooling unit according to Embodiment 3 is mounted on a vehicle, such as a train car, and is an example of a configuration for further reducing noise. The blade 22 in the axial fan 2 in the outdoor cooling unit is configured so as to satisfy 0.15<Lf/Lh<0.5, where Lh is the height of the housing from the base 11 to the suction portion 12 and Lf is the axial height of the blade 22, as illustrated in FIG. 2. The reason for this will be described below.

The relationship between Lf/Lh and the noise reduction amount tp will be described using FIG. 8. A reduction in the axial height Lf of the blade 22 results in a reduction in the blade area of the blade 22. To provide an effective work of the blades 22, it is necessary to increase the number of the blades 22. The increase in the number of the blades 22 means an increase in the number of sound sources. This leads to increased noise. An increase of the axial height Lf of the blade 22 means narrowing of an air passage of flows of air blown from the axial fan 2. This increases ventilation resistance, thus leading to increased noise.

FIG. 8 reveals that in the range of 0.15<Lf/Lh<0.5, the noise reduction amount is substantially equal to or larger than 5 dB and a large advantageous effect of reducing no Se obtained. The outdoor cooling unit can effectively suppress the above-described noise increase by including the blades 22 satisfying 0.15<Lf/Lh<0.5 and thus can further reduce noise. Accordingly, the outdoor cooling unit can achieve further noise reduction.

Embodiment 4

Figure 9:
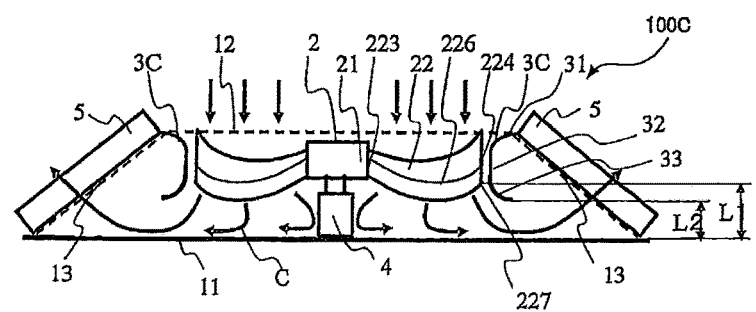
FIG. 9 is a schematic cross-sectional view that illustrates a cross-sectional configuration of an outdoor cooling unit in a vehicle air-conditioning apparatus according to Embodiment 4 of the present invention.
Figure 10:
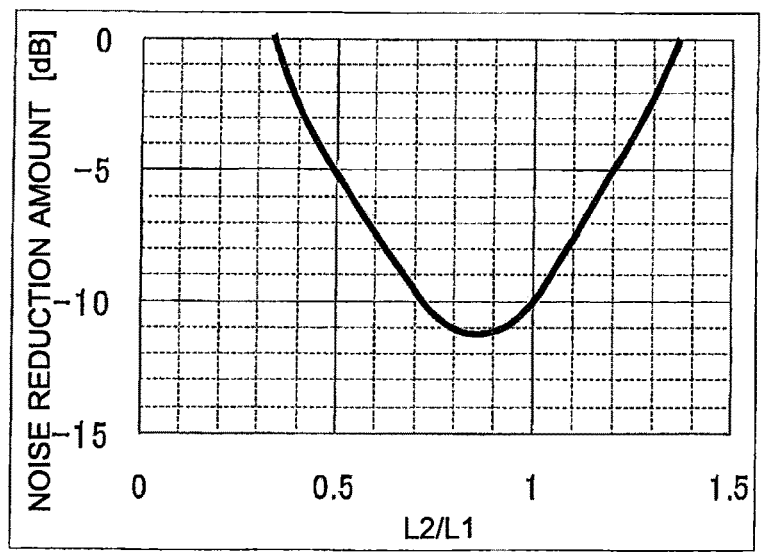
FIG. 10 illustrates the relationship between L1/L2 and a noise reduction amount in the outdoor cooling unit in the vehicle air-conditioning apparatus according to Embodiment 4 of the present invention.
Figure 11:
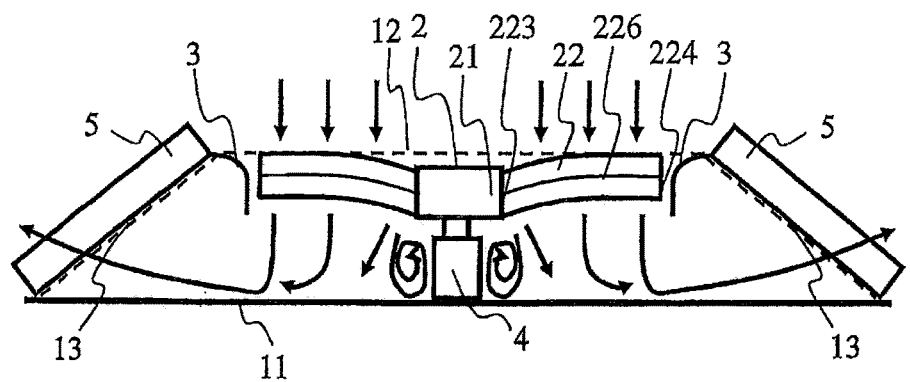
FIG. 11 is a cross-sectional view of a known outdoor cooling unit in a vehicle air-conditioning apparatus.

FIG. 9 is a schematic cross-sectional view that illustrates a cross-sectional configuration of an outdoor cooling unit 100C in a vehicle air-conditioning apparatus according to Embodiment 4 of the present invention. FIG. 10 illustrates the relationship between L1/L2 and a noise reduction amount in the outdoor cooling unit 100C. The outdoor cooling unit 100C will be described with reference to FIGS. 9 and 10. In Embodiment 4, description focuses on the differences from Embodiment 1, the same reference numerals are used for the same portions as in Embodiment 1, and description thereof is omitted.

The outdoor cooling unit 100C according to Embodiment 4 is mounted on a vehicle, such as a train car, and is an example of a configuration for further reducing noise. The outdoor cooling unit 100C differs from the outdoor cooling unit 100 according to Embodiment 1 in that a casing 3C has a different shape. As illustrated in FIG. 9, the casing 3C surrounding the axial fan 2 includes a round suction portion 31 on the upstream side, a linear duct portion 32, and a round blow portion 33 on the downstream side. The round suction portion 31 and the round blow portion 33 are connected by the linear duct portion 32.

The blade 22 in the axial fan 2 in the outdoor cooling unit 100C is configured so as to satisfy 0.5<L2/L1<1.2, where L1 is the distance between the blade outer trailing edge end section 227 and the base 11 (bottom of the housing 10) and L2 is the distance between the downstream end of the round blow portion 33 and the base 11 (bottom of the housing 10). The reason for this will be described below.

The relationship between L2/L1 and the noise reduction amount tp will be described using FIG. 10. The inclusion of the round blow portion 33 in the downstream portion of the casing 3C enables flows of air in the downstream of the axial fan 2 to be smoothly guided in the outer circumferential direction along the round blow portion 33. Thus a turbulent flow can be suppressed. Shortening of L2 means narrowing of the air passage for use in air blown from the axial fan 2, increases the ventilation resistance, and thus leads to increased noise. Extending of L2 increases the gap between the axial fan 2 and the casing 3C, increases an air leakage flow, and thus leads to increased noise.

FIG. 10 reveals that in the range of 0.5<L2/L1<1.2, the noise reduction amount is substantially equal to or larger than 5 dB and a large advantageous effect of reducing noise is obtained. The outdoor cooling unit 100C can effectively suppress the above-described noise increase by including the blades 22 satisfying 0.5<L2/L1<1.2 and thus can further reduce noise. Accordingly, the outdoor cooling unit 100C can achieve further noise reduction. That is, the inclusion of the round blow portion 33 in the casing 3C enables flows of air in the downstream of the axial fan 2 to be smoothly guided in the outer circumferential direction along the round blow portion 33. Thus the outdoor cooling unit 100C can suppress a turbulent flow. The outdoor cooling unit 100C can effectively suppress an increase in the ventilation resistance caused by narrowing of the air passage for use in air blown from the axial fan 2 resulting from shortening of L2 and an increase in the air leakage flow caused by an increase in the casing gap resulting from extending of L2. Thus a large advantageous effect of reducing noise is obtainable.

The present invention is described above in separated Embodiments 1 to 4. The features in Embodiments 1 to 4 may be combined.

REFERENCE SIGNS LIST 2 axial fan 3 casing 3C casing 4 motor 5 heat exchanger 10 housing 11 base 12 suction portion 13 discharge portion 21 boss 22 blade 31 round portion 32 linear duct portion 33 round portion 100 outdoor cooling unit 100A outdoor cooling unit 100B outdoor cooling unit 100C outdoor cooling unit 221 leading edge 222 trailing edge 223 inner circumferential end 224 outer circumferential end 225 chord central point 226 chord center line 227 blade outer trailing edge end section

The invention claimed is:

1. An outdoor cooling unit in a vehicle air-conditioning apparatus, the outdoor cooling unit comprising:
a housing that includes a suction portion and a discharge portion;
an axial fan that includes a rotating shaft and a boss rotatable about a shaft center and a plurality of blades arranged on an outer circumferential portion of the boss and that is arranged directly below the suction portion, the suction portion being an opening in a part of a top of the housing;
a casing that surrounds the axial fan;
a motor that supports the axial fan and that is configured to rotate the axial fan; and
a heat exchanger arranged adjacent to the discharge portion in the housing,
wherein the outdoor cooling unit is configured such that an angle between a normal line to a suction plane of the suction portion and a normal line to a discharge plane of the discharge portion is acute and such that air inside the housing flows in a substantially checkmark-shape, substantially V shape or substantially U shape,
wherein each of the blades is configured such that a chord center line is convexly curved toward a downstream side of airflow over an entire length of the blade in a radial direction from an inner circumferential end of the blade adjacent to the rotating shaft to an outer circumferential end of the blade distant from the rotating shaft,
wherein the chord center line is formed by connecting chord central points from the inner circumferential end of the blade to the outer circumferential end of the blade and projecting the connected chord central points on a plane containing the rotating shaft,
wherein the convexly curved cord center line has a lowest point positioned lower than a position of a chord central point at the inner circumferential end and a position of a chord central point at the outer circumferential end in an axial direction of the rotating shaft,
wherein 0.15<Lf/Lh<0.5 is satisfied, where Lh is a height of the housing and Lf is an axial height of the blade,
wherein the casing includes a round suction portion on an upstream side, a round blow portion on the downstream side, and a linear duct portion that connects the round suction portion and the round blow portion, and
wherein the blade is configured so as to satisfy 0.5<L2/L1<1.2,
where L1 is a distance between a blade outer trailing edge end section and a bottom of the housing and L2 is a distance between a downstream end of the round blow portion and the bottom of the housing.

2. The outdoor cooling unit in the vehicle air-conditioning apparatus of claim 1, wherein the blade is configured so as to satisfy at least one of 0°<α<80° and 0°<β<20°, where α is an angle between a tangent line to the chord center line at the outer circumferential end in the axial fan and a plane perpendicular to the rotating shaft, β is an angle between a tangent line to the chord center line at the inner circumferential end in the axial fan and a plane perpendicular to the rotating shaft, and an angle formed when the chord center line is convexly curved toward the downstream side is positive.

3. The outdoor cooling unit in the vehicle air-conditioning apparatus of claim 1, wherein the motor is disposed in a downstream side of the axial fan.

4. The outdoor cooling unit in the vehicle air-conditioning apparatus of claim 1, wherein the axial fan is disposed in a more downstream side than the suction portion located at an end portion in an upstream side of the casing.

* * * * *